3,301,394
SHEATH PACKAGE
Walter P. Baermann and Armand V. Cooke, Raleigh, N.C., and Everett A. Peterson, Mineola, N.Y., assignors to Medical Supply Company, Rockford, Ill., a corporation of Illinois
Filed Oct. 15, 1965, Ser. No. 496,560
9 Claims. (Cl. 206—63.2)

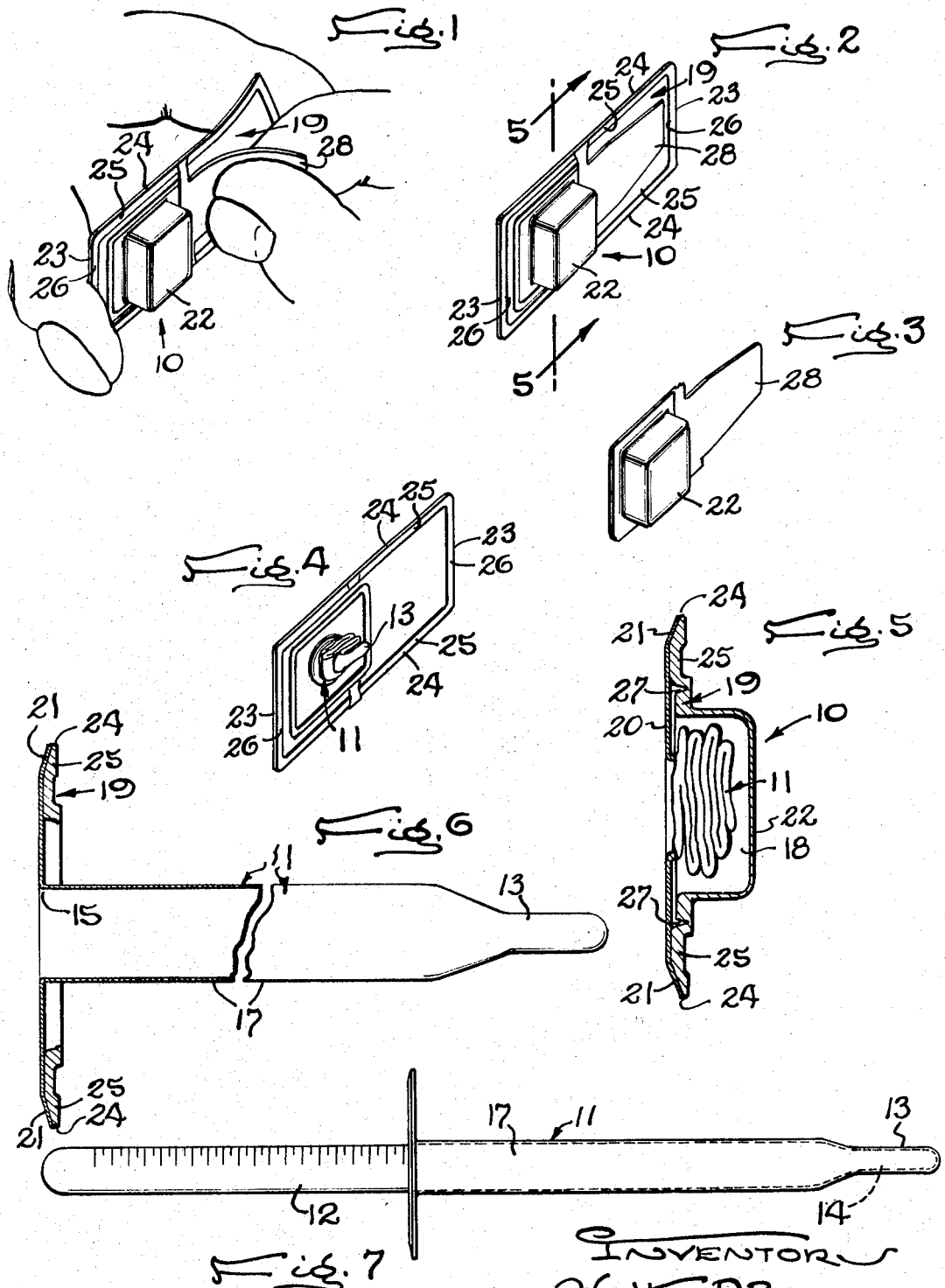

This invention relates to a package for a sheath having a sterile outside surface and intended for use as a protective cover for a thermometer or other instrument to be inserted in a body cavity. The sterile condition of the sheath is maintained by the package until the latter is opened for insertion of the thermometer which thus is covered during use and need not itself be sterilized between uses.

The general object of the present invention is to simplify the construction of a package of the foregoing character, as compared to prior sheath packages, and make it easier to open the package and handle the sheath while maintaining the sterile condition of the latter.

A more detailed object is to fully expose the sheath and make it ready for insertion of the thermometer and use simply by removing one side of the package while leaving the remainder of the package joined to the sheath to serve as a convenient handle for the sheath.

Another object is to utilize the sheet of material from which the sheath is formed as one side of the package.

A further object is to provide such a package which may be made on high-speed production machinery at low cost.

Still another object is to fold the sheath within the package for optimum compactness and to expose the folded sheath for insertion of the thermometer in a quick and simple manner.

Other objects and advantages of the invention will become apparent from the following detailed description taken in connection with the accompanying drawings, in which FIGURE 1 is a perspective view of a sheath package embodying the novel features of the present invention showing the condition of the package in the hands of a user as it is about to be opened.

FIG. 2 is a perspective view of the package alone.

FIG. 3 is a perspective view of the portion of the package that is removed during opening.

FIG. 4 is a perspective view of the remaining portion of the package.

FIG. 5 is an enlarged cross-sectional view taken along the line 5—5 of FIG. 2.

FIG. 6 is an enlarged view, broken away and partly in cross-section, of the portion shown in FIG. 4 with the sheath extended.

FIG. 7 is a side view of the parts shown in FIG. 6 during insertion of the thermometer in the sheath.

As shown in the drawings for purposes of illustration, the invention is embodied in a package 10 for a disposable sheath 11 intended for use as a sterile cover for a thermometer 12 (FIG. 7) to prevent transmission of bacteria and other infectious organisms from the thermometer to the user. Such sheaths eliminate the need for sterilization of thermometers between uses and are sufficiently inexpensive to be discarded after one use. While the invention is described herein in connection with a thermometer sheath, it will be readily apparent that it also applies to packages for sheaths sized and shaped to cover other instruments.

In this instance, the sheath 11 is an elongated tube having a closed end portion 13 for covering the bulb 14 of the thermometer 12 and an open end 15 through which the thermometer is inserted in the manner shown in FIG. 7. The sheath is composed of a suitable heat-conducting impervious material and preferably is resiliently flexible and sized to receive the thermometer with a stretch fit.

For example, the sheath may be a tube of soft and pliable vinyl or latex with a normal cross-sectional area slightly less than the cross-sectional area of the thermometer 12. The closed end portion 13 of the sheath is reduced in diameter to fit snugly about the theremometer bulb 14, and the length of the sheath is sufficient to cover at least the portion of the thermometer that is to be inserted in the body cavity of the user. The length of the reduced diameter portion may be varied according to the type of thermometer to be covered, so-called bayonet thermometers having longer bulbs than the blunt type.

Until the sheath 11 is to be used, it is protected by the package 10 against contamination. Preparatory to use, the package is opened and the thermometer 12 is inserted in the sheath as shown in FIG. 7. Then the bulb end portion of the thermometer, covered by the sheath, is inserted in the patient, the only surface that touches the patient being the outside 17 of the sheath. After the thermometer is removed, the sheath may be stripped off and discarded, having served its purpose of preventing contact between the thermometer and the user.

The present invention is based upon the realization that only the outside 17 of the sheath 11 contacts the user and needs to be protected by the package 10, and takes advantage of this fact in providing an improved package that is simpler and more compact in construction than prior sheath packages and facilitates the handling of the sheath without contamination thereof during insertion and use of the thermometer. To these ends, the sheath is folded into a space 18 defined between two outside sheets 19 and 20 of suitably impervious material with the open end 15 sealed to the sheet 20 around a hole therein opening into the interior of the sheath, and the two sheets are joined together by a continuous seal 21 extending completely around the sheath whereby the two sheets and the sheath itself cooperate to seal the interior of the package. The package is opened quickly and easily by removing the portion of the sheet 19 covering the sheath while leaving the remainder of the package joined to the sheath to serve as a convenient handle for the sheath.

Herein, the space 18 is an open-sided recess in the cover sheet 19 defined by a box-like cover or dome 22 integral with the cover sheet which is of elongated rectangular cross-section with the dome formed adjacent one of its end edges 23 and spaced from its longitudinal edges 24. This sheet preferably is composed of thin but relatively stiff thermoplastic vinyl from which the dome may be deformed outwardly upon the application of pressure when the sheet is in a heated plastic condition. For example, the sheet may be on the order of .008 of an inch thick. In effect, the dome is an open-sided package which is closed by the backing sheet and the sheath.

While the sheath 11 and the backing sheet 20 could be formed separately and then sealed together around the hole, the fabrication of the package 10 and the sheath is greatly simplified by forming the sheath integrally with the backing sheet as shown in FIG. 6. For this purpose, the sheath is composed of the same thermoplastic material as the backing sheet and is stretched in a heated plastic condition out of the sheet to form the hole, the sheath and the continuous joint between the sheath and the sheet in a single operation. The hole preferably is circular in shape and somewhat larger than the cross-section of the thermometer.

The backing sheet 20 is made the same size and shape as the cover sheet 19 with the hole overlying and opening toward the recess 18 in the dome 22 when the two sheets are disposed in side-by-side relation in the completed package. To assemble the package, the sheets are placed in this condition with the sheath 11 folded back and forth upon itself within the dome as shown in FIG. 5, and the seal 21 then is formed between the sheets. While the seal may be formed simply by applying heat and pressure to the outer sides of the sheets, it is preferred to use electronic welding to fuse the adjacent surfaces of the sheets together along the four edges. The rigidity of the cover sheet preferably is increased by forming strengthening corrugations or ribs 25 and 26 along its edges.

Sterilization of the interior of the package 10 and the outside 17 of the sheath 11 may be accomplished in various ways such as by irradiation of the closed package or by gas sterilization, that is, the forcing of sterilizing gas under pressure into the package through the pores of the material. The term "impervious," as used herein, means impenetrable by bacteria, and does not refer to the permeability of the material with respect to such pressurized gas or penetration by radiation.

To facilitate the opening of the package 10, the cover sheet 19 is weakened by a score line 27 (FIGS. 5 and 6) formed in its inner side prior to assembly of the package and extending around the dome 22 between the latter and the seal 21 so that the weakened section at the score line constitutes means releasably connecting the dome to the remainder of the package. Accordingly, the dome may be pulled away from the package to expose the sheath. Preferably, a pull tab 28 is secured at one end to the weakened area of the sheet inside the score line with its free end portion overlying the cover sheet as shown in FIG. 2. Thus, to open the package, the user simply grasps the package with one hand in the manner shown in FIG. 1 and pulls the tab away from the package with the other hand. This ruptures the cover sheet along the score line and leaves the package in the condition shown in FIG. 4. It will be seen that the remaining portions of the two sheets may be held in one hand without touching the sheath. If the sheath does not unfold upon removal of the dome, the thermometer will straighten and extend the sheath as it is inserted through the backing sheet. The portion of the package remaining on the sheath also facilitates the stripping of the sheath off the thermometer after use.

From the foregoing, it will be readily apparent to those skilled in the art that the package 10 is capable of high-speed production on automatic machinery using low cost materials. Moreover, it is quite simple and compact in construction and is easier to open and use without touching the sterile outside surface 17 of the sheath 11.

We claim as our invention:

1. A sheath package comprising a first sheet of relatively rigid impervious material having an area of the sheet deformed out of the plane of the sheet and forming a box-like dome defining a recess in one side of said sheet, a second sheet of impervious material of approximately the same size and shape as said first sheet disposed against said one side and having a hole therethrough opening toward said recess, an elongated flexible sheath composed of the same material as said second sheet and having an open end integrally joined to the second sheet around said hole, the other end of said sheath being closed and the sheath being folded into said dome, a continuous seal joining said sheets together along all edges thereof and protectively closing the interior of the package, and a score line in said first sheet extending around said dome between the latter and said seal thereby weakening the sheet for easy removal of the dome and the area of the first sheet within said line to expose and permit unfolding of said sheath for use.

2. A sheath package as defined in claim 1 in which said dome and the weakened area are offset from the center of and are substantially smaller than said first sheet to leave a substantial portion of the latter joined to the sheath to serve as a handle for the latter after the package is opened.

3. A sheath package as defined in claim 2 further including a pull tab secured to the outer side of said weakened area to facilitate removal of the latter from the package.

4. A sheath package comprising a first sheet having an integral portion offset out of the plane of the remainder of the sheet and forming a dome defining an open-sided recess in one side of said sheet, a second sheet overlying said one side and having a hole therethrough opening toward said recess, an elongated tubular sheath of flexible material having a closed end and an open end, said sheath being folded back and forth upon itself and disposed in said recess with said open end at said hole, a first continuous joint securing said open end to said second sheet completely around said hole whereby the latter opens into the inside of said sheath, a second continuous joint securing said sheets together along a line extending around said dome and said hole thereby sealing the interior of said package and protectively enclosing the outside surface of said sheath, and means for separating said dome from the remainder of the package and thereby exposing and permitting unfolding of the sheath.

5. A sheath package as defined in claim 4 in which said separting means include a score line weakening said first sheet around said dome for easy rupturing of the sheet along the score line.

6. A sheath package as defined in claim 5 further including a pull tab secured to the outer side of the area of said first sheet defined by said score line.

7. A thermometer sheath package comprising first and second sheets disposed in side-by-side relation, said first sheet being formed with a dome portion offset away from said second sheet and defining a space between said sheets, said second sheet having a hole therethrough opening toward said space, an elongated tubular sheath composed of flexible material and having a closed end and an open end, said sheath being sized and shaped to receive the end portion of a thermometer to be inserted in a patient and being fitted in said space, a first continuous joint sealing said open end to said second sheet completely around said hole whereby the latter opens into the inside of said sheath, and a second continuous joint sealing said sheets together completely around said space whereby said sheets, said joints and the sheath itself cooperate to seal the interior of said package.

8. A sheath package as defined in claim 7 further including means weakening one of said sheets along a line extending around said sheath inside said second joint for easy separtion of a portion of said one sheet to open the package.

9. A thermometer sheath package comprising an elongated tubular sheath composed of flexible material and sized and shaped to receive one end portion of a thermometer with a snug fit, a cover composed of impervious material and defining an open-sided recess for receiving said sheath, said sheath being fitted in said recess with said open end adjacent the open side of said recess, a sheet of impervious material overlying said open side and having a hole therethrough opening into said recess, a first continuous impervious joint securing said sheath to said sheet around said hole whereby the latter opens into the interior of said sheath for insertion of a thermometer therein, a second continuous impervious joint securing said sheet to said cover around said open side whereby said joints and said sheath cooperate to seal the interior of the package for protection of the outside surface of the sheath, and means releasably connecting said cover to the portion of said sheet joined to said sheath whereby said cover may be pulled away to expose the sheath for use.

References Cited by the Examiner

UNITED STATES PATENTS

| | | | |
|---|---|---|---|
| 2,002,618 | 5/1935 | Sutter | 229—51 X |
| 2,892,538 | 6/1959 | Middleton et al. | 206—78 X |
| 2,899,110 | 8/1959 | Parker. | |
| 2,983,276 | 5/1961 | Brown | 220—23 X |
| 2,993,590 | 7/1961 | Denton | 206—78 |

FOREIGN PATENTS

| | | |
|---|---|---|
| 951,214 | 3/1964 | Great Britain. |
| 365,939 | 1/1963 | Switzerland. |

LOUIS G. MANCENE, *Primary Examiner.*

THERON E. CONDON, *Examiner.*

J. M. CASKIE, *Assistant Examiner.*